US012265257B2

(12) United States Patent
Nagase et al.

(10) Patent No.: US 12,265,257 B2
(45) Date of Patent: Apr. 1, 2025

(54) OPTICAL MODULATOR

(71) Applicant: TDK CORPORATION, Tokyo (JP)

(72) Inventors: Kenji Nagase, Hong Kong (CN); Hiroshi Take, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 215 days.

(21) Appl. No.: 17/716,440

(22) Filed: Apr. 8, 2022

(65) Prior Publication Data

US 2023/0036811 A1    Feb. 2, 2023

(30) Foreign Application Priority Data

Mar. 24, 2022  (CN) .......................... 202210296417.1

(51) Int. Cl.
| | |
|---|---|
| *G02B 6/125* | (2006.01) |
| *G02B 6/12* | (2006.01) |
| *G02F 1/035* | (2006.01) |
| *G02F 1/21* | (2006.01) |
| *G02F 1/225* | (2006.01) |

(52) U.S. Cl.
CPC .......... *G02B 6/125* (2013.01); *G02F 1/0356* (2013.01); *G02F 1/212* (2021.01); *G02F 1/2255* (2013.01); *G02B 2006/1204* (2013.01); *G02B 2006/12097* (2013.01); *G02F 2202/20* (2013.01)

(58) Field of Classification Search
CPC ....... G02F 1/212; G02F 1/2255; G02F 1/0356
USPC ....................................................... 385/1–3
See application file for complete search history.

(56) References Cited

U.S. PATENT DOCUMENTS

| | | | |
|---|---|---|---|
| 5,129,017 A | 7/1992 | Kawano et al. | |
| 6,532,324 B2 | 3/2003 | Lupu et al. | |
| 8,346,025 B2* | 1/2013 | Gill ...................... | G02F 1/2257 |
| | | | 438/31 |
| 8,582,927 B1 | 11/2013 | Thaniyavarn | |
| 9,946,100 B2 | 4/2018 | Yanagawa et al. | |
| 2002/0106141 A1 | 8/2002 | Gopalakrishnan | |

(Continued)

FOREIGN PATENT DOCUMENTS

| | | |
|---|---|---|
| JP | S64-048021 A | 2/1989 |
| JP | H08-016746 B2 | 2/1996 |

(Continued)

*Primary Examiner* — Michelle R Connelly
*Assistant Examiner* — Kirsten D. Endresen
(74) *Attorney, Agent, or Firm* — Oliff PLC

(57) ABSTRACT

An optical modulator includes a substrate; an electro-optical material layer formed on a predetermined region of the substrate; a buffer layer formed on the substrate which is provided so as to cover the electro-optical material layer; and an electrode formed on the buffer layer. The electro-optical material layer has a RF portion optical waveguide which is applied with a modulation signal and is patterned, and a DC portion optical waveguide which is applied with a DC voltage and is patterned. The electrode has an RF portion electrode formed on the buffer layer where the RF portion optical waveguide is located and a DC portion electrode formed on the buffer layer where the DC portion optical waveguide is located. The film thickness of the DC portion electrode is smaller than the film thickness of the RF portion electrode.

5 Claims, 2 Drawing Sheets

(56) References Cited

U.S. PATENT DOCUMENTS

| | | | |
|---|---|---|---|
| 2004/0028334 A1 | 2/2004 | Marazzi et al. | |
| 2013/0170782 A1* | 7/2013 | Evans | G02F 1/2257 385/3 |
| 2020/0218126 A1 | 7/2020 | Iwatsuka et al. | |
| 2020/0310170 A1 | 10/2020 | Iwatsuka et al. | |
| 2021/0199997 A1* | 7/2021 | Okahashi | G02F 1/2252 |
| 2021/0311336 A1* | 10/2021 | Kharel | G02F 1/2255 |
| 2021/0356836 A1* | 11/2021 | Sugiyama | G02F 1/212 |

FOREIGN PATENT DOCUMENTS

| | | | | |
|---|---|---|---|---|
| JP | 3149088 B2 | 3/2001 | | |
| JP | 2004-226471 A | 8/2004 | | |
| JP | 2006-195383 A | 7/2006 | | |
| JP | 2006-317550 A | 11/2006 | | |
| JP | 2007-199500 A | 8/2007 | | |
| JP | 4485218 B2 | 6/2010 | | |
| JP | 2012-078375 A | 4/2012 | | |
| JP | 2014-142411 A | 8/2014 | | |
| JP | 2015-014715 A | 1/2015 | | |
| JP | 5853880 B2 | 2/2016 | | |
| JP | 2019-074595 A | 5/2019 | | |
| WO | WO-2019039215 A1 * | 2/2019 | | G02F 1/0316 |
| WO | 2019/069815 A1 | 4/2019 | | |

* cited by examiner

OPTICAL MODULATOR

FIELD

The present invention relates to an optical modulator used in the fields of optical communication and optical measurement, in particular to an electrode structure of a Mach-Zehnder optical modulator.

BACKGROUND

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a single-crystal lithium niobate substrate has been practically used (see, e.g., Patent Document 1). The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference. Although high-speed optical modulators having a modulation speed of 40 Gb/s or more are commercially available, they have a major drawback that the entire length thereof is as long as about 10 cm.

In contrast, Patent Document 2 discloses a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

CITATION LIST

Patent Document

Patent Document 1: Japanese Patent No. 4485218
Patent Document 2: JP 2019-74595A

SUMMARY

The inventors of the present invention have conducted in-depth research on the electrode structures of the optical modulators disclosed in Patent Documents 1 and 2, and as a result, they have discovered the following technical problems that have not been considered by those skilled in the art so far: In such an optical modulator with multiple electrodes disclosed in Patent Documents 1 and 2, since the electrodes are close to each other, the noise signal in the adjacent DC portion electrodes affects the RF portion electrode, resulting in electrical crosstalk, and in the high-frequency signal propagating in the RF portion electrode, the high-frequency characteristics cannot be improved, and the disadvantages, such as narrowing the frequency band, occur.

The present invention has been completed in view of the above-mentioned problems, and its object is to provide an optical modulator which can suppress electrical crosstalk caused by the noise signal generated in the DC portion electrode and can improve high-frequency characteristics and achieve a widening of bandwidth of the optical frequency band in the high-frequency signals propagating in the RF portion electrode.

In order to achieve the above object, an aspect of the present invention relates to an optical modulator, comprising a substrate, an electro-optical material layer formed on the predetermined region of the substrate, a buffer layer formed on the substrate which is provided so as to cover the electro-optical material layer, and an electrode formed on the buffer layer, the electro-optical material layer has a RF portion optical waveguide which is applied with a modulation signal and is patterned and a DC portion optical waveguide which is applied with a DC voltage and is patterned, and the electrode has an RF portion electrode formed on the buffer layer where the RF portion optical waveguide is located and a DC portion electrode formed on the buffer layer where the DC portion optical waveguide is located, and a film thickness of the DC portion electrode is smaller than a film thickness of the RF portion electrode.

In the above optical modulator having the RF portion electrode and the DC portion electrode, by making the film thickness of the DC portion electrode smaller than that of the RF portion electrode, the electrical crosstalk reduction effect can be sufficiently performed, and the electrical crosstalk caused by the noise signal generated in the DC portion electrode can be effectively suppressed, and the high-frequency characteristics can be improved and a widening of bandwidth of the optical frequency band can be achieved in the high-frequency signal propagating in the RF portion electrode. In addition, in the above optical modulator, by using a thin DC portion electrode, the material used for the electrode can be reduced to achieve the low cost of the optical modulator.

In addition, in the above optical modulator according to one aspect of the present invention, preferably, the film thickness of the DC portion electrode is equal to or smaller than ½ of the film thickness of the RF portion electrode. In this way, by making the film thickness of the DC portion electrode be small to ½ or less with respect to the film thickness of the RF portion electrode, the electrical crosstalk caused by the noise signal generated in the DC portion electrode can be more effectively suppressed, and the high-frequency characteristics can be improved and the widening of bandwidth of the optical frequency band can be achieved further in the high-frequency signal propagating in the RF portion electrode.

In addition, in the above optical modulator according to one aspect of the present invention, preferably, the film thickness of the DC portion electrode is 0.1 to 3.2 μm, and the film thickness of the RF portion electrode is 1 to 8 μm.

In addition, in the above optical modulator according to one aspect of the present invention, preferably, at least either of the DC portion optical waveguide and the RF portion optical waveguide is formed by folding back, the DC portion electrode and the RF portion electrode are formed by folding back along to the DC portion optical waveguide and the RF portion optical waveguide, respectively, the DC portion electrode and the RF portion electrode are adjacent to each other by this folding back. Herein, the inventors of the present invention have conducted in-depth research on the electrode structures of the optical modulators disclosed in Patent Documents 1 and 2, and as a result, they have discovered: In the optical modulator provided with two electrodes formed by folding back disclosed in Patent Document 1, the electrodes are easier to be close to each other, thus, the above effect of the present invention becomes more prominent in the structure that at least either of the DC portion optical waveguide and the RF portion optical waveguide is formed by folding back, the DC portion electrode and the RF portion electrode are formed by folding back along to the DC portion optical waveguide and the RF portion optical waveguide, respectively, the DC portion electrode and the RF portion electrode are adjacent to each other by this folding back.

According to one aspect of the present invention, an optical modulator which can suppress electrical crosstalk caused by the noise signal generated in the DC portion electrode and can improve high-frequency characteristics and achieve the widening of bandwidth of the optical frequency band in the high-frequency signals propagating in the RF portion electrode is provided.

DETAILED DESCRIPTION OF THE EMBODIMENT(S)

Hereinafter, preferred embodiments of the present invention will be described in detail with reference to the accompanying drawings.

First Embodiment

Figure 1:
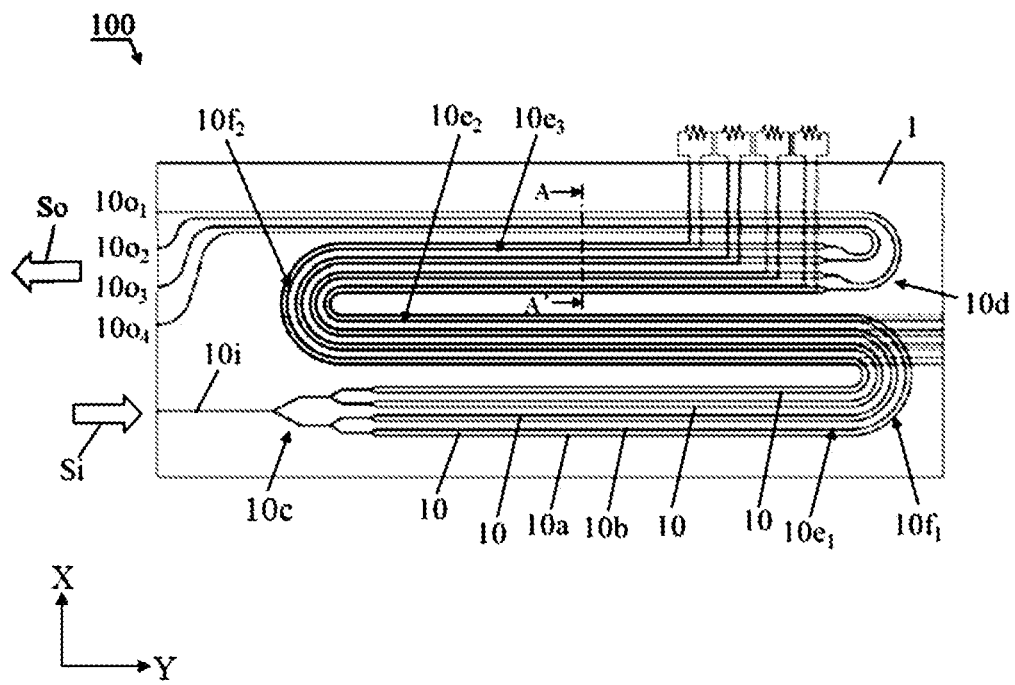
FIG. 1 is a top view of the optical modulator according to the embodiment of the present invention.
Figure 2:
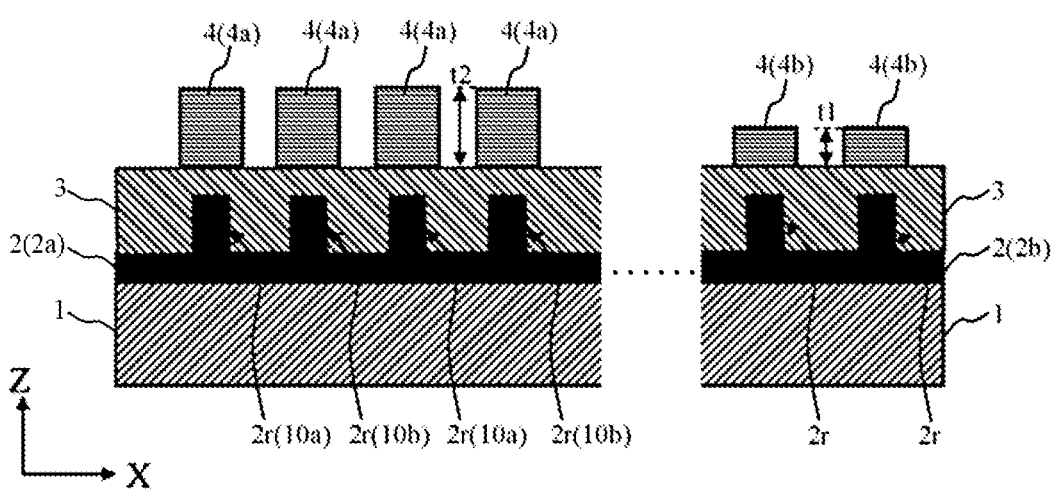
FIG. 2 is a cross-sectional view of the optical modulator according to the embodiment of the present invention taken along line A-A' of FIG. 1.

FIG. 1 is a top view of an optical modulator according to the present embodiment of the present invention. FIG. 2 is a cross-sectional view of the optical modulator according to the present embodiment of the present invention taken along line A-A' of FIG. 1. As illustrated in FIG. 1, the optical modulator 100 according to the embodiment has four optical waveguides 10 formed on the substrate 1. However, the number of optical waveguides is not particularly limited, and there may be 1 to 3 or 5 or more optical waveguides 10.

Optical waveguides 10 are formed by folding back on a plane. For example, in the present embodiment, the optical waveguides are formed by folding back twice on the plane. Thus, they include first to third linear portions $10e_1$, $10e_2$ and $10e_3$ arranged parallel to each other, a first curved portion $10f_1$ connecting the first linear portion $10e_1$ and the second linear portion $10e_2$, and a second curved portion $10f_2$ connecting the second linear portion $10e_2$ and the third linear portion $10e_3$. However, it is not limited to this, and the optical waveguides 10 may be also formed by folding back three times or more on the plane.

In the optical modulator, the long element length is a big technical problem for practical use, but as shown in FIG. 1, forming the optical waveguide by folding back can greatly shorten the element length and obtain significant effects. In particular, the optical waveguide formed of the lithium niobate film has a feature that the loss is small even if the radius of curvature is reduced to, for example, about 50 μm, and it is suitable for the present embodiment.

The optical waveguides 10 are a Mach-Zehnder optical waveguides having a first optical waveguide 10a and a second optical waveguide 10b. The Mach-Zehnder optical waveguides 10 are optical waveguides having a structure of Mach-Zehnder interferometer. There are the first and the second optical waveguides 10a and 10b branched from one input optical waveguide 10i by a branch portion 10c, and the first and the second optical waveguides 10a and 10b are converged by a multiplexing portion 10d and there are a plurality of output optical waveguides $10o_1$, $10o_2$, $10o_3$ and $10o_4$. After the input light Si is branched in the branch portion 10c and travels through the first and the second optical waveguides 10a and 10b, it is multiplexed in the multiplexing portion 10d and output from the plurality of output optical waveguides $10o_1$, $10o_2$, $10o_3$ and $10o_4$ as modulation light So. Specifically, the input light Si is input to one end of the first linear portion $10e_1$, travels from one end of the first linear portion $10e_1$ to the other end, folds back in the first curved portion $10f_1$ and travels from one end of the second linear portion $10e_2$ to the other end in a direction opposite to the first linear portion $10e_1$, and further folds back in the second curved portion $10f_2$ and travels from one end of the third linear portion $10e_3$ to the other end in the same direction as the first linear portion $10e_1$.

As shown in FIG. 2, the optical modulator 100 has a multilayer structure in which a substrate 1, a waveguide layer 2 as an electro-optical material layer, a buffer layer 3 and an electrode layer 4 are laminated in this order. The substrate 1 is, for example, a sapphire substrate. The waveguide layer 2 made of electro-optical material represented by lithium niobate ($LiNbO_3$, hereinafter, referred to as "LN") is formed on the surface of the substrate 1. The waveguide layer 2 has the first and the second optical waveguides 10a and 10b composed of a ridge portion 2r.

Figure 3:
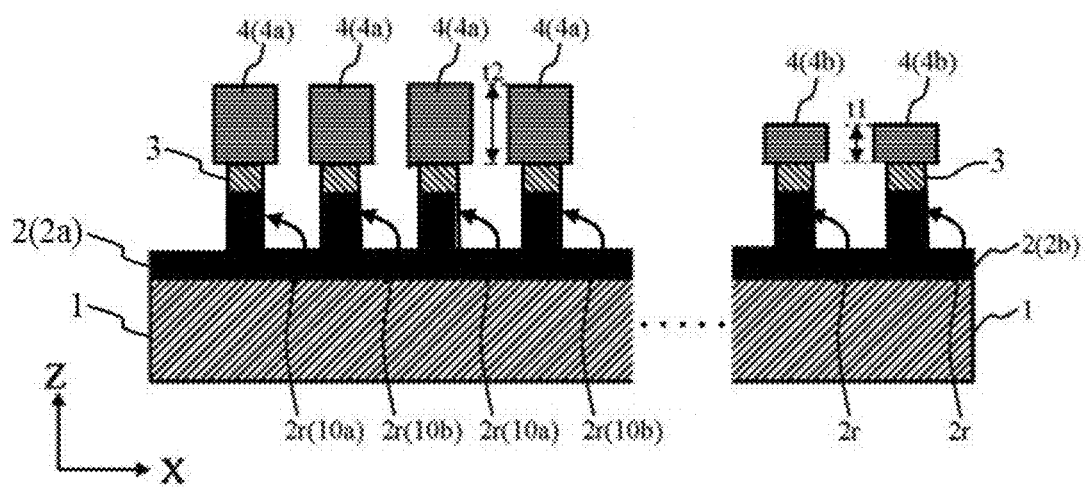
FIG. 3 shows the optical modulator according to another embodiment of the present invention.

The buffer layer 3 is a layer formed on the substrate 1 by covering the entire surface of the region where the ridge portion is not formed in the upper surface of the waveguide layer 2 and the side surface and the upper surface of the ridge portion 2r so as to prevent the light propagating in the first and the second optical waveguides 10a and 10b from being absorbed by the electrodes 4a and 4b. The buffer layer 3 only needs to function as an intermediate layer between the optical waveguide and the electrode, and the material of the buffer layer 3 can be widely selected as long as it is a non-metal. For example, the buffer layer 3 can use a ceramic layer composed of insulating materials such as metal oxides, metal nitrides and metal carbides. The material of the buffer layer 3 can be a crystalline material or an amorphous material. The buffer layer 3 is preferably formed of a material with a lower refractive index and higher transparency than the waveguide layer 2. For example, $Al_2O_3$, $SiO_2$, $LaAlO_3$, $LaYO_3$, ZnO, $HfO_2$, MgO, $Y_2O_3$ etc. can be used. The thickness of the buffer layer formed on the optical waveguide can be about 0.2 to 1.2 μm. In the present embodiment, the buffer layer 3 not only covers the upper surfaces of the first and the second optical waveguides 10a and 10b, but also covers the entire surface of the region where the ridge portion 2r is not formed in the upper surface of the waveguide layer 2 and the side surface of the ridge portion 2r. However, as long as the buffer layer 3 is formed at least in the upper surface of the ridge portion 2r of the waveguide layer 2, and the buffer layer 3 can also be patterned by selectively only covering the vicinity of the upper surface of the first and the second optical waveguides 10a and 10b. See FIG. 3.

In order to reduce the light absorption of the electrode, the film thickness of the buffer layer 3 can be as large as possible, and in order to apply a high electric field to the first and the second optical waveguides 10a and 10b, the film thickness of the buffer layer 3 can be as small as possible. Since the light absorption of the electrode and the applied voltage of the electrode are trade-off, it is necessary to set an appropriate film thickness according to the purpose. The higher the dielectric constant of the buffer layer 3, the more $V\pi L$ (an indicator of electric field efficiency) can be reduced. Therefore, it is preferable. The lower the refractive index is, the thinner the buffer layer 3 can be. Therefore, it is preferable. Preferably, the dielectric constant and refractive index are appropriately selected according to the purpose. In the application of optical modulator, it is preferred to consider the relative dielectric constant. In this embodiment, in order to reduce $V\pi L$, the relative dielectric constant is preferably 6-18. At this time, $LaAlO_3$, $LaYO_3$ and other materials can be preferred. Of course, it is not limited to the recorded composition, but more preferably a material with relatively high relative dielectric constant.

The electrode layer 4 is arranged on the buffer layer 3. The electrode layer 4 is provided with the RF portion electrode 4a and the DC portion electrode 4b. The RF portion electrode 4a overlaps the ridge portion 2r corresponding to the first and the second optical waveguides 10a and 10b, and it is opposite to the first and the second optical waveguides 10a and 10b via the buffer layer 3. The DC portion electrode 4a overlaps the ridge portion 2r corresponding to the first and the second optical waveguides 10a and 10b, and it is opposite to the first and the second optical waveguides 10a and 10b via the buffer layer 3.

Although not shown, the periphery of the electrode 4 can also be covered with a material with a relatively low dielectric constant. There is no special limitation, but it can be covered with SiN, $SiO_2$, $Al_2O_3$ and resin (polyimide, polyamide, epoxy and acrylic acid).

When a modulation signal (AC signal) is input to the RF portion electrode 4a, since the first and the second optical waveguides 10a and 10b are formed of materials with electro-optical effects such as lithium niobate, according to the electric field imparted to the first and the second optical waveguides 10a and 10b, the refractive index of the first and the second optical waveguides 10a and 10b changes as $+\Delta n$ and $-\Delta n$, respectively, and the phase difference between a pair of optical waveguides 10a and 10b changes. The signal light modulated by the change of the phase difference is output from the output optical waveguide.

When a DC bias is input to the DC portion electrode 4b, the formation region of the DC portion electrode 4b is set to be close to the side of the output end of the Mach-Zehnder optical waveguides 10, but it can be also set to be close to the side of the input end. As shown in FIG. 1, the DC portion electrode is preferably arranged on the outside compared with the RF portion electrode. Further, it is more preferable that the RF portion electrode is configured in a manner of being sandwiched by a plurality of DC portion electrodes.

The waveguide layer 2 is not particularly limited as long as it is an electro-optical material layer formed of electro-optical materials, but it is preferable to be formed of lithium niobate ($LiNbO_3$). This is because lithium niobate has a large electro-optical constant and is suitable as a constituent material of optical devices such as optical modulators.

Hereinafter, the structure of the present embodiment when the waveguide layer 2 is a lithium niobate film is described in detail.

The substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has triple symmetry, it is preferable that the single crystal substrate of the base also has the same symmetry. Thus, the single-crystal sapphire substrate preferably has a c-plane, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by $2\theta$-$\theta$ X-ray diffraction and second confirming poles.

Specifically, first, in the $2\theta$-$\theta$X-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002) and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNbA_yO_z$. A denotes an element other than Li, Nb and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, Ce etc., alone or in combination.

The lithium niobate film preferably has a thickness of equal to or smaller than 2 μm. This is because a high-quality lithium niobate film having a thickness larger than 2 μm is difficult to form. The lithium niobate film having an excessively small thickness cannot completely confine light, allowing light to leak to the substrate 1 or the buffer layer 3.

Even if an electric field is applied to the lithium niobate film, there is also a concern that the change in the effective refractive index of the first and the second optical waveguides 10a and 10b becomes smaller. Thus, the lithium niobate film preferably has a thickness that is at least approximately one-tenth of the wavelength of light to be used.

It is desirable to form the lithium niobate film by a film forming method such as sputtering, CVD or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. For example, if the cladding layer (not shown) is made of $Y_2O_3$, a lithium niobate film of high quality can be formed.

As a formation method for the lithium niobate film, there is known a method of thinly polishing or slicing the lithium niobate single crystal substrate. This method is advantageous in that the same characteristics as the single crystal can be obtained and can be applied to the present invention.

In the present embodiment, the waveguide layer 2 is formed on the predetermined region of the substrate 1 and has a RF portion optical waveguide 2a which is applied with a modulation signal and is patterned and a DC portion optical waveguide 2b which is applied with a DC voltage and is patterned. In FIG. 2, it is illustrated that the RF portion optical waveguide 2a includes four ridge portions 2r, and the DC portion optical waveguide 2b includes two ridge portions 2r.

The electrode has a RF portion electrode 4a formed on the buffer layer 3 where the RF portion optical waveguide 2a is located and a DC portion electrode 4b formed on the buffer layer 3 where the DC portion optical waveguide 2b is located. The film thickness t1 of the DC portion electrode 4b is smaller than the film thickness t2 of the RF portion electrode 4a.

In the above optical modulator provided with the RF portion electrode and the DC portion electrode, by making the film thickness of the DC portion electrode smaller than that of the RF portion electrode, the electrical crosstalk reduction effect can be sufficiently performed, and the electrical crosstalk caused by the noise signal generated in the DC portion electrode can be effectively suppressed, and the high-frequency characteristics can be improved and a widening of bandwidth of the optical frequency band can be achieved in the high-frequency signal propagating in the RF portion electrode. In addition, in the above optical modulator, by using a thin DC portion electrode, the material used for the electrode can be reduced to achieve the low cost of the optical modulator.

In addition, in the present embodiment, the film thickness t1 of the DC portion electrode 4b is preferably ½ or less of the film thickness t2 of the RF portion electrode 4a. In this way, by making the film thickness of the DC portion electrode be small to ½ or less with respect to the film thickness of the RF portion electrode, the electrical crosstalk caused by the noise signal generated in the DC portion electrode can be effectively suppressed, and the high-frequency characteristics can be improved and a widening of bandwidth of the optical frequency band can be achieved in the high-frequency signal propagating in the RF portion electrode.

In addition, in the present embodiment, the film thickness t1 of the DC portion electrode 4b is preferably 0.1 to 3.2 µm, and the film thickness t2 of the RF portion electrode 4a is preferably 1 to 8 µm.

In addition, in FIG. 2, the electrode outside the four arranged RF portion electrodes 4a can also be used as a ground electrode so as to get better crosstalk reduction effects.

EXAMPLES

According to the following Table 1, the modulators of Example 1-7 and Comparative example 1 are produced. Their crosstalk is measured, and the measurement result is shown in Table 1.

TABLE 1

|  | the film thickness t1 of the DC portion electrode 4b | the film thickness t2 of the RF portion electrode 4a | t1/t2 | crosstalk |
| --- | --- | --- | --- | --- |
| Example 1 | 0.1 | 3.0 | 0.033 | −56.0 dB |
| Example 2 | 0.3 | 4.0 | 0.075 | −58.0 dB |
| Example 3 | 2.0 | 8.0 | 0.25 | −55.0 dB |
| Example 4 | 2.0 | 4.0 | 0.5 | −56.0 dB |
| Example 5 | 3.0 | 6.0 | 0.5 | −56.2 dB |
| Example 6 | 3.2 | 4.3 | 0.744 | −47.0 dB |
| Example 7 | 0.9 | 1.0 | 0.9 | −48.0 dB |
| Comparative example 1 | 4.0 | 4.0 | 1 | −34.0 dB |

According to the above Table 1, if Example 1~7 and Comparative example 1 are compared, by making the film thickness t1 of the DC portion electrode 4b be small with respect to the film thickness t2 of the RF portion electrode 4a in Example 1-7 (that is, the ratio t1/t2 between the film thickness t1 of the DC portion electrode 4b and the film thickness t2 of the RF portion electrode 4a is "T1/T2<1"), the electrical crosstalk caused by the noise signal generated in the DC portion electrode 4b can be effectively suppressed (that is, suppress the electrical crosstalk to be "−45.0 db or less"). In addition, according to the above Table 1, by making the film thickness t1 of the DC portion electrode 4b be ½ or less of the film thickness t2 of the RF portion electrode 4a (that is, the ratio t1/t2 between the film thickness t1 of the DC portion electrode 4b and the film thickness t2 of the RF portion electrode 4a is "T1/T2≤0.5"), it can more effectively suppress the electrical crosstalk caused by the noise signal generated in the DC portion electrode (that is, suppress the electrical crosstalk to be "−55.0 db or less"). In addition, according to the above Table 1, as a preferable range, the film thickness t1 of the DC portion electrode 4b is in the range of 0.1 to 3.2 µm, the film thickness t2 of the RF portion electrode 4a is in the range of 1~8 µm.

The preferable embodiment of the present invention is illustrated above, but the present invention is not limited to the above embodiment, and various changes can be made without departing from the gist of the present invention, and they are also included in the scope of the present invention.

For example, in the above embodiment, an optical modulator provided with four optical waveguides 10 which has a pair of optical waveguides 10a and 10b formed of lithium niobate film epitaxially grown on the substrate 1 respectively is given. However, the present invention is not limited to this structure, and it may be also an optical modulator in which the optical waveguide is formed of electro-optical materials such as barium titanate, lead zirconate titanate etc. In addition, semiconductor materials, polymer materials etc. with electro-optical effect can also be used as waveguide layer 2.

In addition, in the above embodiment, an example in which the optical waveguide is formed on the plane by folding back is given, but the present invention is not limited to this. The optical waveguide can also extend in a straight line without folding back on the plane. In this case, the input light can be input from one end of a linear optical waveguide, propagate in this optical waveguide and be output from the other end.

In addition, as long as the RF portion electrode is formed thicker than the DC portion electrode, its electrode shape is not particularly limited. The upper portion of the RF part electrode can be overhanging on the metal mushroom body, or it can be set as an inverted trapezoidal electrode. On the contrary, it can also be a trapezoid which is small in the upper portion. Among them, the electrode with large width at the upper portion of the electrode is preferred when observing the cross section.

In addition, the electrode is preferably formed by plating.

The invention claimed is:

1. An optical modulator comprising:
    a substrate;
    an electro-optical material layer formed on a predetermined region of the substrate, the electro-optical material layer including an optical waveguide formed in a plane that is parallel to the substrate, the optical waveguide folding back three times in the plane;
    a buffer layer formed on the substrate which is provided so as to cover the electro-optical material layer; and
    an electrode layer formed on the buffer layer, wherein
    the optical guide includes a RF portion optical waveguide which is applied with a modulation signal and is patterned, and a DC portion optical waveguide which is applied with a DC voltage and is patterned,
    the electrode layer has a RF portion electrode formed on the buffer layer where the RF portion optical waveguide is located and a DC portion electrode formed on the buffer layer where the DC portion optical waveguide is located,
    a film thickness of the DC portion electrode is smaller than a film thickness of the RF portion electrode,
    the RF portion optical waveguide includes, in the plane, three linear portions parallel to each other, including a first linear portion, a second linear portion, and a third linear portion, and three curved portions, including a first curved portion, a second curved portion, and a third curved portion,
    the DC portion optical waveguide includes, in the plane, a fourth linear portion parallel to the third linear portion,
    at the first curved portion, the second linear portion is connected to and folds back from the first linear portion,
    at the second curved portion, the third linear portion is connected to and folds back from the second linear portion,
    at the third curved portion, the fourth linear portion is connected to and folds back from the third linear portion,
    the RF portion electrode includes a first RF portion that overlaps with the first linear portion in a thickness direction of the substrate, a second RF portion that overlaps with the second linear portion in the thickness direction of the substrate and a third RF portion that overlaps with the third linear portion in the thickness direction of the substrate,
    the DC portion electrode overlaps with the fourth linear portion in the thickness direction of the substrate,
    the overlap between the first RF portion electrode and the first linear portion forms a first overlapping area that elongates in a direction in which the first linear portion extends,
    the overlap between the second RF portion electrode and the second linear portion forms a second overlapping area that elongates in a direction in which the second linear portion extends,
    the overlap between the third RF portion electrode and the third linear portion forms a third overlapping area that elongates in a direction in which the third linear portion extends,
    the overlap between the DC portion electrode and the fourth linear portion forms a fourth overlapping area that elongates in a direction in which the fourth linear portion extends, and
    the buffer layer is configured to only overlap the optical waveguide in the thickness direction of the substrate without overlapping other areas of the substrate.

2. The optical modulator according to claim 1, wherein the film thickness of the DC portion electrode is equal to or smaller than ½ of the film thickness of the RF portion electrode.

3. The optical modulator according to claim 1, wherein the film thickness of the DC portion electrode is 0.1 to 3.2 μm, and the film thickness of the RF portion electrode is 1 to 8 μm.

4. The optical modulator according to claim 1, wherein
    at least either of the DC portion optical waveguide and the RF portion optical waveguide is formed by folding back,
    the DC portion electrode and the RF portion electrode are formed by folding back to be parallel to the DC portion optical waveguide and the RF portion optical waveguide, respectively, and
    the DC portion electrode and the RF portion electrode are adjacent to each other by the folding back.

5. The optical modulator according to claim 1, wherein
    the substrate is in a shape of a plane having two major surfaces and four sides,
    the optical waveguide includes:
        an input optical waveguide configured to receive input light, the input optical waveguide being located at an end of the first linear portion; and
        an output optical waveguide configured to output modulation light modulated from the input light, the output optical waveguide being located at an end of the fourth linear portion, and
    the input optical waveguide and the output optical waveguide are located on a same side out of the four sides of the substrate.

* * * * *

UNITED STATES PATENT AND TRADEMARK OFFICE
CERTIFICATE OF CORRECTION

Page 1 of 1

PATENT NO. : 12,265,257 B2
APPLICATION NO. : 17/716440
DATED : April 1, 2025
INVENTOR(S) : Kenji Nagase et al.

It is certified that error appears in the above-identified patent and that said Letters Patent is hereby corrected as shown below:

On the Title Page

(30) Foreign Application Priority Data, insert:
--Mar. 30, 2021 (CN).......202110341976.5--

Signed and Sealed this
Fifteenth Day of July, 2025

Coke Morgan Stewart
*Acting Director of the United States Patent and Trademark Office*